United States Patent [19]

Pierson

[11] 4,289,163
[45] Sep. 15, 1981

[54] VENT VALVE FOR A MOBILE TANK

[76] Inventor: Leslie E. Pierson, 3629 Layton, Haltom City, Tex. 76117

[21] Appl. No.: 40,749

[22] Filed: May 21, 1979

[51] Int. Cl.³ .................. F16K 24/00; F16K 35/00
[52] U.S. Cl. .................. 137/587; 137/637.1; 251/63.6; 251/98
[58] Field of Search ........... 137/585, 586, 587, 637.1; 251/63, 63.6, 147, 89, 95, 98

[56] References Cited

U.S. PATENT DOCUMENTS

| | | | |
|---|---|---|---|
| 1,585,512 | 5/1926 | Roades | 137/493.9 |
| 2,096,374 | 10/1937 | Jensen | 137/586 |
| 2,249,090 | 7/1941 | Rabinowicz | 137/637.1 |
| 2,730,126 | 1/1956 | Jensen | 137/587 |
| 2,748,799 | 6/1956 | Roth | 137/587 |
| 3,048,189 | 8/1962 | Chandler | 251/90 |
| 3,070,123 | 12/1962 | Chandler | 137/587 |
| 3,115,894 | 12/1963 | Marx | 137/587 |
| 3,158,406 | 11/1964 | Aller | 251/147 |
| 3,415,273 | 12/1968 | Elboger | 137/587 |
| 3,770,011 | 11/1973 | Muchi | 137/587 |
| 4,036,255 | 7/1977 | Wilson | 137/587 |
| 4,109,677 | 8/1978 | Burnside | 137/587 |
| 4,137,943 | 2/1979 | Rath | 137/587 |

FOREIGN PATENT DOCUMENTS

| | | | |
|---|---|---|---|
| 73391 | 5/1914 | Fed. Rep. of Germany | 137/637.1 |
| 345629 | 5/1933 | Fed. Rep. of Germany | 251/63.6 |
| 56277 | 4/1944 | Netherlands | 137/580 |

Primary Examiner—Martin P. Schwadron
Assistant Examiner—A. Michael Chambers
Attorney, Agent, or Firm—Felsman & Bradley

[57] ABSTRACT

A mobile tank for transporting liquids has a vent valve with a safety device to assure that the vent valve is always open during draining, to relieve vacuum build-up. The vent valve is coupled to a vent port in the top of the tank, and operates on air pressure. The air pressure is controlled by a control valve mounted near the discharge valve. The control arm on the control valve is mounted in an interfering position with the discharge valve, requiring the air control valve to be opened before the tank discharge valve can be opened.

5 Claims, 3 Drawing Figures

VENT VALVE FOR A MOBILE TANK

BACKGROUND OF THE INVENTION

1. Field of the Invention

This invention relates in general to mobile tanks for transporting liquid, and in particular to a vent valve for a mobile tank for reducing negative pressure in the tank during unloading.

2. Description of the Prior Art

Tank trucks for hauling bulk liquids normally have a discharge port and valve at the rear and bottom of the tank, and an intake port in the top. Liquids are poured into the intake, which is then sealed. At the destination, the liquid is drawn out the discharge valve and pumped to a storage facility. During unloading, it is essential that the tank be vented, otherwise the negative pressure, or vacuum, created by the draining liquid, may collapse the tank. To avoid this, the tanks have a vent port in the top. This port is normally covered by a cap during transport to avoid contamination and spillage. At the unloading site, the workers must be careful to remove the cap prior to withdrawl. Occasionally, this step is inadvertently omitted, and the tank collapses as a result.

Spring-loaded vent valves that automatically open under negative pressure are known. One disadvantage, however, is that the valve may freeze or lock in a closed position. This might occur particularly in a tank for hauling edible, viscous liquids, such as vegetable oil. Baffles are normally forbidden in these types of tanks, resulting in sloshing of the liquid. The sloshing liquid can cover the vent valve and congeal, preventing its opening, particularly if the spring protrudes downwardly. Cooler temperatures may freeze the liquid adjacent the vent valve, preventing its opening. Also, the sloshing itself may cause sufficient negative pressure to open the valve and result in spillage.

SUMMARY OF THE INVENTION

It is accordingly the general object of this invention to provide an improved vent valve for relieving vaccum build up within a mobile tank during draining.

It is a further object of this invention to provide an improved vent valve for relieving vacuum within a mobile tank during draining, having safety means to assure that the vent valve is always open during unloading.

In accordance with these objects, a vent valve is provided for coupling to an aperture at the top of the tank. Control means supplies energy to the vent valve to actuate the valve from a closed position to an open position. Safety means cooperates with the control means and tank discharge valve to assure that energy is being supplied to the valve every time the tank discharge valve is opened. Preferably the vent valve is actuated by air pressure, and the control means consists of an air control valve. Preferably, the safety means consists of a handle for operating the air valve that is positioned to interfere with the discharge valve when both are closed. The air control handle must be moved to the open position, thereby opening the vent valve, before the discharge valve can be opened.

DESCRIPTION OF THE PREFERRED EMBODIMENT

Figure 1:
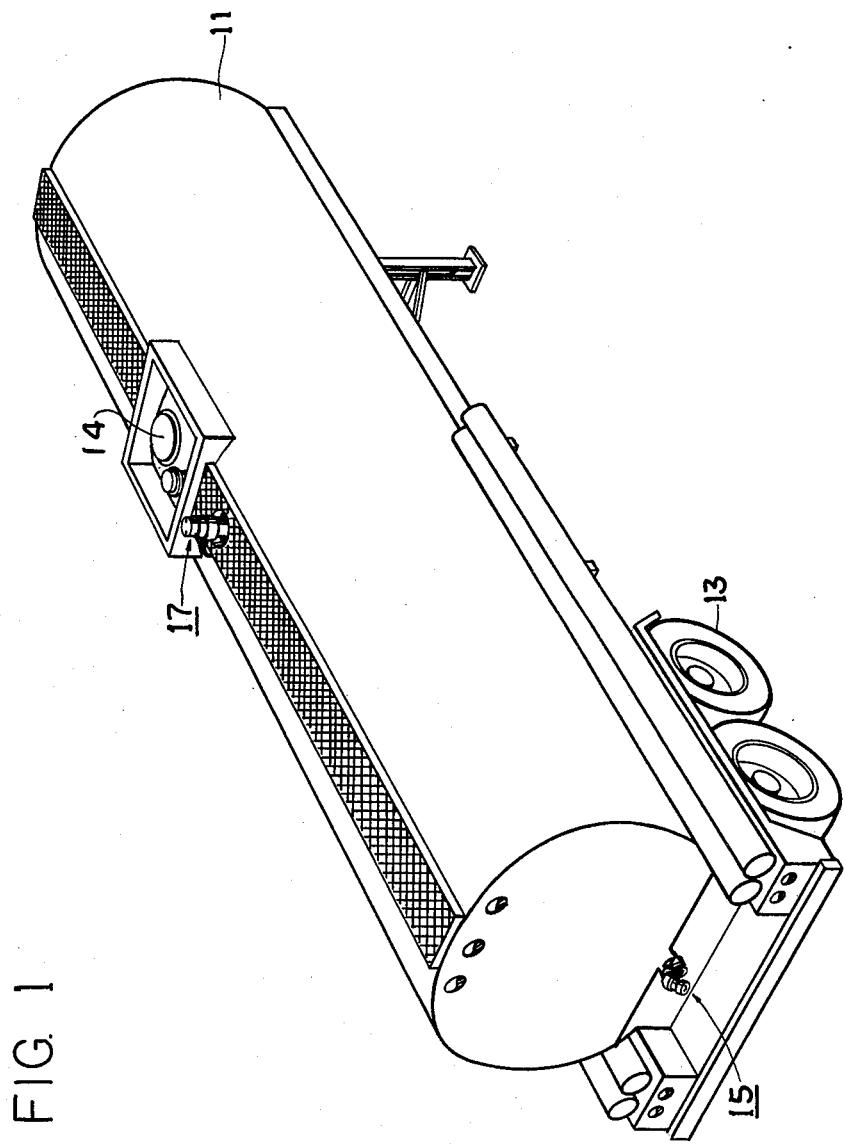
FIG. 1 is a perspective view of a tank trailer having a vent valve means constructed in accordance with this invention.

Referring to FIG. 1 tank 11 consists of a large, generally cylindrical tank mounted on a frame having tandem wheels 13 and means for connection to a tractor (not shown). Tank 11 has an intake port 14 for loading the liquid. A discharge valve and port assembly 15 is located at the rear and the bottom for pumping or draining the liquid from the tank. A vent valve assembly 17 is mounted on the top of tank 11.

Figure 2:
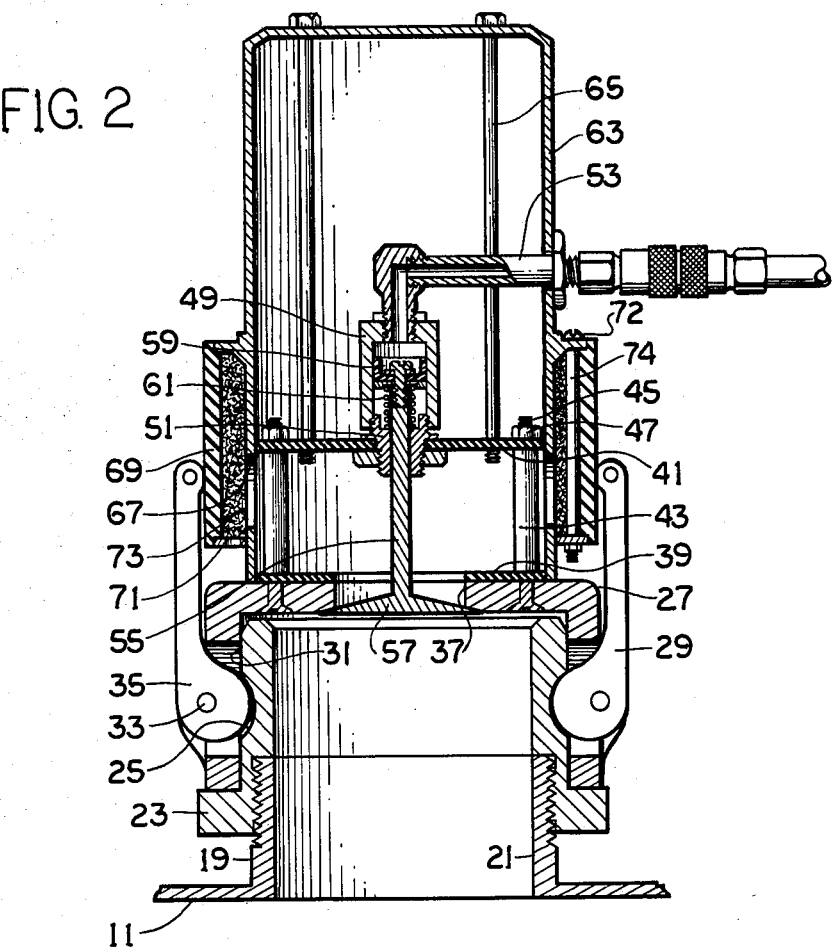
FIG. 2 is a vertical sectional view of the vent valve portion of the valve means of FIG. 1.

Referring to FIG. 2, tank 11 has an upwardly facing cylindrical pipe 19 with external threads surrounding an aperture or vent port 21. A cylindrical sleeve 23 has internal threads that threadingly engage the threads of pipe 19. Sleeve 23 has an annular groove 25 on its exterior surface. A cylindrical cap 27 releasably engages sleeve 23. Cap 27 has two locking or lever arms 29 mounted 180 degrees apart in slots 31. Each lever arm 29 is pinned by a pin 33 to cap 27. Each lever arm has a cam portion 35 adjacent the pin 33 that is adapted to engage the groove 25. Rotating arms 29 downward removes the cam portion 35 from groove 25, allowing cap 27 to be removed from sleeve 23.

Cap 27 has an aperture with a bevelled lower edge in its top defining a valve seat 37. A valve support is mounted to the top of the cap 27. The valve support includes a lower circular disk or plate 39 and an upper circular disk or plate 41, spaced upward from the lower plate 39. The upper plate 41 is connected to the lower plate 39 by four columns or sleeves 43 (only two shown) that are spaced around the edge of the plates 39 and 41. A bolt 45 extends through the top of cap 27 and through each sleeve 43, where it is secured by a nut 47 at the top to retain the valve support to the cap 27. Lower plate 39 has an aperture of the same diameter as valve seat 37.

An air cylinder 49 is mounted to plate 41 by a nut 51. Air cylinder 49 is connected to a conduit or air line 53 for supplying air pressure. A vent valve having a valve stem 55 and an enlarged valve head 57 is used with the assembly. It is of the same general type as used in automobiles. Valve head 57 extends below the top of cap 27. The upper edge of valve head 57 seats against the valve seat 37 to seal the interior of the tank from the exterior. The elongated rod or stem 55 extends upwardly through the aperture in the lower support plate 39, through a passage in nut 57 and into air cylinder 49. A resilient piston or plunger 59 is secured to the top of the valve stem 55. A helical spring 61 is compressed between the top of nut 51 and the bottom of piston 61. Piston 61 slidably engages the interior wall of air cylinder 49 and moves valve head 57 downwardly in response to air pressure from air line 53. Spring 61 serves as spring means to urge the valve stem upwardly 57 into seating contact with valve seat 37.

A cup or cylindrical shaped housing 53 is secured to the upper valve support plate 41 by bolts 65. Housing 63 covers the valve support and air cylinder 49, with its lower edge bearing against the top of cap 27. Housing 63 has a plurality of apertures 67 in its sidewall, spaced in an array and in communication with the space between the valve support plates 39 and 41. An outer cylindrical band 69 of larger diameter than housing 63 encircles the apertures 67, defining an annular passage between it and housing 63. A perforated ring 71 comprising a flat annular disk containing apertures is connected between the lower edge of outer band 69 and housing 63. The upper edge of band 69 bears against a shoulder 72 formed on the exterior of housing 63. Bolts and nuts 74 secure the ring 71 and band 69 to housing 63. An annular filter 73 may be placed in the annular space between outer band 69 and housing 63, if it is desired to filter the air being drawn in during unloading.

Figure 3:
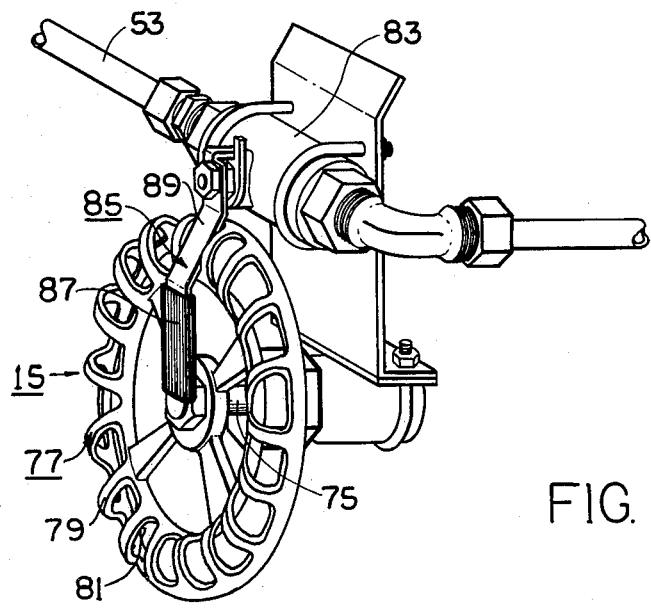
FIG. 3 is a perspective view of the control valve portion of the vent valve means of FIG. 1.

Referring to FIG. 3, tank 11 is of the type having a discharge port and valve assembly 15 with a manual control comprising a rod or stem 75 connected to a circular member or handle 77 for rotation therewith. Handle 77 has a plurality of protuberances 79 spaced about the periphery. Discharge valve 15 operates by rotating the handle 77 counterclockwise, resulting in its moving outward from tank 11 in a cylindrical path. The protuberances 79 facilitate gripping. In certain types, the protuberances comprise regularly spaced rounded teeth or cogs on the periphery of a circular handle 77. In other types, such as the type that is shown, the protuberances consist of a plurality of arcuate bands 79 protruding outward from the circular handle 77, with apertures 81 between them.

An air control valve 83 is mounted to tank 11 directly above handle 77. Air control valve 83 is mounted in air line 53 for controlling the air pressure to air cylinder 49. Air valve 83 has an internal valve and an arm or handle 85 connected to it for movement therewith. Handle 85 comprises an elongated member with a portion 87 for grasping by the operator, and an inclined portion 89 that places portion 87 in a different plane and further outward from valve 83. The inclined portion 89 is of less width than apertures 81 and will fit between two of the bands 79. Handle 85 rotates 90° from the vertical or closed position shown, to a horizontal open position. In the closed position, handle 85 extends into the path of discharge valve handle 77. Handle 85 is spaced slightly further outward than handle 77 in the closed positions, so that very little rotation of handle 77 will cause a band 79 to strike handle 85, preventing further rotation. Portion 89 will be then located partially inside an aperture 81. In the horizontal open position, handle 85 is out of the path of handle 77 and does not interfere with its movement.

In operation, the tank will be loaded with liquid through intake port 14. Vent valve assembly 17 will normally be in the closed position during filling, such as shown in FIG. 2 and FIG. 3. When the liquid is to be unloaded, the operator first connects the discharge port to a conduit and normally pumps the liquid from the tank by a suction pump. The air valve handle 85 will be rotated from the vertical closed position to a horizontal open position. Air from the compressor located on the tractor, or from a storage tank located on the trailer, will be supplied to air cylinder 49 through conduit 53. This pushes piston 50 downward, unseating valve head 57 from valve seat 37. The discharge handle 77 is then rotated counterclockwise allowing the liquid to be discharged from the tank. As the liquid level decreases, air is drawn in through the perforated plate 71, through filter 73, apertures 67, and valve seat 37 into the interior of the tank 11 to fill the space previously occupied by the liquid. This relieves negative pressure, or vacuum build-up inside the tank, which could result in collapsing. Housing 63 seals against cap 27, requiring essentially all incoming air to be drawn through filter element 73 and apertures 67. Once fully discharged, handle 77 is rotated clockwise, moving it inward and closing the discharge port. The air valve handle 85 is then rotated from the horizontal position back into the vertical position, cutting off the air to air cylinder 49 and allowing spring 61 to reseat the valve head 57 on valve seat 37.

Valve assembly 17 serves as valve means for communicating the interior of the tank with the exterior atmosphere during unloading through the discharge port. Air valve 83 serves as control means for supplying energy to actuate the valve means from the closed position to the open position. Handle 85 and its positioning serves as safety means for requiring the control means to actuate the valve means to the open position when the discharge valve is open.

It should be apparent that an invention having significant advantages has been provided. The vent valve relieves vacuum build-up within the tank during unloading. The valve portion is located above the top of the tank in order to minimize contact with the liquid contained therein. This reduces the chance for liquid to congeal on the valve. Even if sloshing does occur and if the valve becomes coated with a viscous liquid, the air pressure normally available on tractor trailers is 100 to 125 psi. This is sufficient to force valve head 57 from valve seat 37. By positioning the air valve handle in an interfering position with the discharge valve handle, when they are both in the closed position, it is impossible for an operator to fully open the discharge valve without first actuating the vent valve. This fail-safe system relies on air pressure, which is present with substantially all tank trailers, and is of simple construction.

While the invention has been shown in only one of its embodiments, it should be apparent to those skilled in the art that it is not so limited but is susceptible to various changes and modifications without departing from the spirit thereof. For example, electric energy could be used to actuate the vent valve.

I claim:

1. In a mobile tank for transporting liquids, having a discharge port and a manually operable discharge valve adjacent its bottom for discharging liquid, an improved means to reduce negative pressure in the tank while unloading the liquid, comprising;

valve means, mounted to the tank adjacent its top in an aperture, having an open position for communicating the interior of the tank with the exterior, and a closed position for closing the aperture; the valve means having a valve seat separating the interior of the tank from the exterior and a reciprocal valve head carried on the interior side of the valve seat for seating against the valve seat when the valve means is in the closed position;

a manually operable air valve mounted in a line extending from a source of air pressure to the valve means, the valve means being responsive to said air pressure for moving from the closed position to the open position;

said manually operable air valve having a handle that is movable from a closed position to an open position for selectively supplying said air pressure to the valve means; and mounting means for mounting the air valve to the tank so that the air valve handle physically interferes with coacting handle means on said discharge valve during the opening movement of the discharge valve when the air valve is in said closed position preventing said discharge valve from opening, said air valve handle movable to a position when said air valve is moved towards said open position such that said air valve handle no longer interfers with said discharge handle means to allow said discharge valve to be moved to the open position.

2. A mobile tank for transporting liquid, comprising in combination:
   a vent port in the top of the tank;
   a threaded pipe encircling and extending upwardly from the vent port;
   a threaded sleeve secured to the pipe and having an annular groove;
   a cylindrical cap inserted over the sleeve, the cap having a top containing an aperture with a valve seat on its lower edge;
   a pair of locking arms, each having a cam member at its base, pivotally secured to the cap and adapted to engage the annular groove to releasably retain the cap to the sleeve;
   a valve support mounted to the top of the cap;
   an air cylinder mounted to the top of the valve support and connected to an air line extending to a source of air pressure;
   a vent valve having a stem and an enlarged head on its lower end, the upper edge of the head adapted to seat against the valve seat the stem extending through the valve support and into the air cylinder, the vent valve being longitudinally reciprocal;
   a piston secured to the top of the stem inside the air cylinder, the piston being longitudinally slidable in the air cylinder for moving the vent valve downward in response to air pressure;
   spring means carried by the cap for urging the head of the vent valve upward into seating contact with the valve seat;
   a discharge port and valve located at the bottom of the tank for discharging liquid, the discharge valve having a handle and a stem for opening the discharge valve by rotation, the handle moving outward from the tank during opening rotation, defining a cylindrical path;
   an manually operable air valve mounted to the tank adjacent the discharge valve and connected into the air line for controlling air pressure to the air cylinder, control means including said air valve for selectively supplying air pressure to the air cylinder when venting of the tank is required including mounting means for mounting said air valve to the tank so that the air valve operating handle physically interfers with coacting handle means on said discharge valve during the opening movement of the discharge valve when the air valve is in the closed position preventing said discharge valve from opening, said air valve handle movable to a position when said air valve is moved toward said open position such that said air valve handle no longer interfers with said discharge handle means to allow said discharge valve to be moved to said open position.

3. The apparatus according to claim 2 further comprising:

a cup-shaped housing mounted to the cap and encircling the air cylinder, valve support and vent valve, the housing having an aperture in its wall;
   a band mounted to and encircling the housing adjacent the housing aperture, the band being of larger diameter than the housing, defining an annular space; and
   a filter element located in the annular space, the housing being sealed to the cap so that air entering the tank through the aperture in the cap must initially pass through the filter element for cleansing.

4. In a mobile tank for transporting liquids, having a discharge port and a manually operable discharge valve adjacent its bottom for discharging liquid, an improved vent means to reduce negative pressure in the tank while unloading the liquid, comprising:
   a cylindrical cap releasably secured to top of the tank over a vent port that is in communication with the interior of the tank, the cap having a top containing an aperture with a valve seat on the lower side of the top of the cap;
   a valve support mounted to the top of the cap;
   a vent valve having a stem with an enlarged head on its lower end, the stem adapted to extend upwardly through the aperture in the cap, with the valve head below the aperture, the vent valve being reciprocable in the valve support between a lower position in which the valve head is shifted away from the valve seat to communicate the interior of the tank with the exterior, and an upper position in which the upper surface of the valve head seats against the valve seat to close the interior of the tank from the exterior;
   an air cylinder mounted to the upper end of the valve support and connected to an air valve;
   a piston secured to the stem inside the air cylinder, the piston being slidably carried in the air cylinder for moving the stem downward when subjected to air pressure;
   spring means, carried by the cap, for urging the valve head into seating contact with the valve seat; and
   control means for selectively supplying air pressure to the air cylinder when venting of the tank is required, including a manually operable air valve mounted in a line extending from a source of air pressure, the air valve having a handle that is movable between open and closed positions for opening and closing the air valve; and mounting means for mounting said air valve to said tank so that said air valve handle physically interfers with coacting handle means on said discharge valve during the opening movement of said discharge valve when said air valve is in the closed position preventing said discharge from opening, said air valve handle movable to position when said air valve is moved toward said open position such that said air valve handle no longer interfers with said discharge handle means to allow said discharge valve to be moved to said open position.

5. In a mobile tank for transporting liquids, having a discharge port and a manually operable valve adjacent its bottom for discharging liquid, an improved means to reduce negative pressure in the tank while unloading the liquid, comprising;
   valve means, mounted to the tank adjacent its top in an aperture, having an open position for communicating the interior of the tank with the exterior, and a closed position for closing the aperture; the valve means having a valve seat separating the interior of the tank from the exterior and a reciprocal valve head carried on the interior side of the valve seat for seating against the valve seat when the valve means is in the closed position;

control means for supplying energy to actuate the valve means from the closed position to the open position;

safety means for requiring the control means to actuate the valve means to the open position when the discharge valve is manually opened;

the control means comprising an air valve mounted to the tank in a line extending from a source of air pressure to the valve means, the valve means being responsive to air pressure for moving from the closed position to the open position;

the air valve being mounted adjacent the discharge valve, the discharge valve being of the type having a stem and a handle for opening the discharge valve by rotation, causing the handle to move in an outward path from the tank during opening, and wherein the safety means comprises an arm, mounted to the air valve for opening and closing the air valve, that extends into the path of the handle when the air valve is closed, and that moves out of the path of the handle when the air valve is open, thereby requiring the air valve to be opened in order to fully open the discharge valve; and the handle being generally circular, with a plurality of protuberances spaced aroung its periphery to facilitate gripping, and wherein the arm has a portion that will extend between two of the protuberances when the air valve is in the closed position.

* * * * *